United States Patent [19]

Schultz

[11] Patent Number: 4,787,504

[45] Date of Patent: Nov. 29, 1988

[54] ADJUSTABLE RADIUS CONVEYOR ROLL

[75] Inventor: Stephen J. Schultz, Indiana Township, Allegheny County, Pa.

[73] Assignee: PPG Industries, Inc., Pittsburgh, Pa.

[21] Appl. No.: 916,071

[22] Filed: Oct. 6, 1986

[51] Int. Cl.[4] .............................................. B65G 13/02
[52] U.S. Cl. ...................................... 198/782; 198/826
[58] Field of Search ........................ 65/107, 273, 253; 198/782, 826, 780, 827

[56] References Cited

U.S. PATENT DOCUMENTS

| | | | |
|---|---|---|---|
| 831,495 | 9/1906 | Anderson | 198/826 |
| 2,957,277 | 10/1960 | White et al. | 65/273 |
| 3,126,090 | 3/1964 | Bitzer | 198/827 X |
| 3,211,276 | 10/1965 | Dilgard | 198/827 |
| 3,812,909 | 5/1974 | Rogalsky et al. | 198/782 X |
| 3,978,974 | 9/1976 | Morrissey et al. | 198/782 |
| 4,015,969 | 4/1977 | Brown et al. | 65/107 X |
| 4,043,785 | 8/1977 | Reese | 65/273 X |
| 4,052,185 | 10/1977 | Kolakowski | 65/273 X |
| 4,066,429 | 1/1978 | Reese et al. | 65/273 X |
| 4,144,964 | 3/1979 | Valcalda | 198/827 X |
| 4,217,126 | 8/1980 | Hagedorn et al. | 65/273 X |
| 4,376,643 | 3/1983 | Kahle et al. | 65/273 X |
| 4,381,933 | 5/1983 | Schultz et al. | 65/107 X |
| 4,575,389 | 3/1986 | Halberschmidt et al. | 65/107 X |

FOREIGN PATENT DOCUMENTS

550690 2/1957 Belgium ............................. 65/107

Primary Examiner—Kenneth J. Dorner
Assistant Examiner—José V. Chen
Attorney, Agent, or Firm—Andrew C. Siminerio

[57] ABSTRACT

An adjustable radius conveyor roll for shaping and conveying heat softened glass sheets. Interconnected glass sheet engaging members are rotatably mounted along a flexible shaft of the conveyor roll. The ends of the roll are pivotally connected to pivoting support arms. A roll flexing arrangement includes a collar positioned at the center of the roll and a roll flexing drive to move the center of the roll in a vertical direction to adjust the curved configuration of the conveying roll.

19 Claims, 5 Drawing Sheets

ADJUSTABLE RADIUS CONVEYOR ROLL

BACKGROUND OF THE INVENTION

1. Field of the Invention

This invention relates to the shaping of heat softenable material sheets, in a particular, to an adjustable conveyor roll for shaping hot glass sheets of varying transverse configurations.

2a. Technical Considerations

In the manufacture of tempered shape glass sheets, glass sheets are normally heated to their heat softening temperature, shaped by one of a variety of well known forming operations, and cooled to impart at least a partial temper in the glass sheet. In particular, in a roll forming operation the glass sheet is deformed by gravity to assume a transverse and/or longitudinal curvature. Transverse curvature is formed by conveying the hot glass sheet over a series of transversely curved, longitudinally spaced forming rolls at the exit end of a heating furnace. Longitudinal curvature is formed by mounting the individual forming rolls along a longitudinally extending arc.

Current automotive design requires a variety of different glass sheet shapes and curvatures. Often times, a roll forming apparatus includes transversely curved conveyor rolls with rigid shafts so that the apparatus is limited to shaping glass to a single transverse radius of curvature. It would be advantageous to have an adjustable radius conveyor roll for use in a roll forming arrangement, wherein the roll profile can be easily adjusted to correspond to the transverse shape of different curved glass sheet configurations.

2b. Patents of Interest

U.S. Pat. No. 3,064,796 to Orwin discloses a conveyor roll for supporting belts of an endless belt conveyor, in which the load carrying run of the belt has a troughed configuration. Each roller assembly includes a bowed shaft extending continuously between end supports, and a number of spaced rollers adapted to support the trough configuration of the belt. The rolls rotate about the shaft by frictional engagement between the conveyor belt and the engaging surface of the roller.

U.S. Pat. Nos. 1,530,499 to Knode; 2,820,541 to Barnish et al; 3,089,580 to Dilgard; 3,088,580 to Hughes, and 3,092,240 to Tyler et al each disclose an adjustable conveyor roll. In particular, Knode teaches a three part conveyor roll wherein the two outer end sections of the roll may be pivoted upward relative to the horizontal center section. The remaining patents each teach a continuously curved conveyor roll, wherein the transverse radius of curvature of the rolls can be varied. In each patent the roll assembly is suspended at its opposite ends by pivoting support arms and the radius of curvature of the rolls is adjusted by pivoting the support arms so as to move the opposing ends of the conveyor roll closer or further apart. In each of these patents, the conveyor rolls are free wheeling i.e., they freely rotate about a central shaft and do not include a drive assembly to directly rotate the conveyor roll.

U.S. Pat. No. 4,311,509 to Reader et al, discloses a conveyor roll comprised of a curved shaft and a plurality of cylindrically shaped glass support members mounted around the curve shaft. Each member includes a hub having a loosely fitting tongue and groove connecting arrangement and an outer collar of material that does not mar a hot glass sheet when in contact therewith. The tongue and groove arrangement interconnects the support members so that when torque is applied to one of the end hubs of the conveyor roll, he glass engaging surfaces of the collars rotate in unison, preferably at a uniform speed, to convey the curved glass sheet.

U.S. Pat. No. 4,226,608 to McKelvey discloses flexible shaping rolls comprised of relatively tightly wound coil springs mounted on pivoting end supports by stub shafts. The transverse radius of curvature of the rolls is adjusted by positively pivoting the upper portion of end supports in order to move bearing housings which support the stub shafts, inwardly or outwardly, and simultaneously vary the angularity thereof.

SUMMARY OF THE INVENTION

An object of the present invention is to provide an adjustable radius conveyor roll for conveying a article, such as a glass sheet. The transverse radius of curvature of the roll can be varied to provide a variety of transverse curvature configurations. The roll includes a flexible shaft pivotally supported at its ends by pivoting support arms. Two sets of interconnected glass sheet support members are mounted around the shaft in generally abutting relationship for rotation about the shaft. A hold down device positioned between the two sets of glass sheet support members moves a portion of the shaft in a generally vertical direction so as to change the transverse radius of curvature of the rolls. The flexible shaft is preferably a spring steel bar with a rectangular cross section and includes a plurality of cylindrically shaped sleeve members alternating with resilient spacer members mounted along the length of the bar. Individual drives may be used to torque each end of the roll and rotate each set of glass sheet support members. In addition, a conveyor made from a number of these adjustable radius conveyor rolls may use a single drive to torque the ends of a number of rolls so that the glass sheet support members rotate in unison. The conveyor may also include a drive to activate the hold down device on a number of conveyor rolls so that they change their radius of curvature in unison.

Another object of the invention is to provide a method of adjusting the transverse radius of curvature of an adjustable radius conveyor roll. The ends of the roll are pivotally supported and a force is applied to a portion of the roll between the roll end to displace the roll portion in a generally vertical direction so as to change the curvature of the roll.

DETAILED DESCRIPTION OF THE INVENTION

The adjustable radius conveyor rolls of the present invention are presented in connection with a roll forming apparatus and operation for shaping heat softened glass sheets but it is understood that the invention can be used in any forming, shaping, or conveying operation wherein the use of adjustable radius conveyor rolls would be beneficial.

Figure 1:
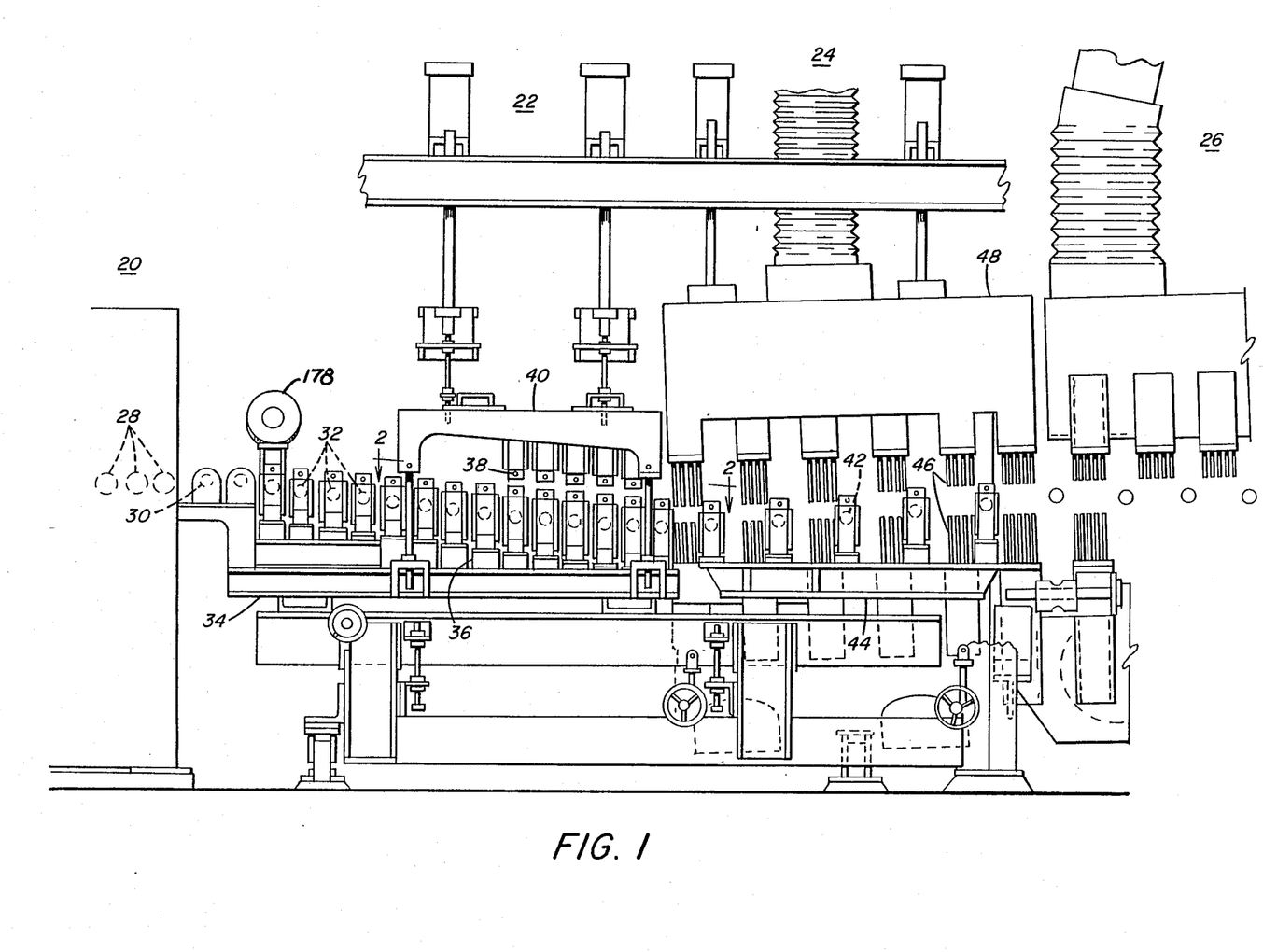
FIG. 1 is a side view of a roll forming apparatus incorporating the adjustable radius conveyor rolls of the present invention.

A typical roll forming apparatus as illustrated in FIG. 1, incorporates a glass sheet heating furnace 20 followed by a roll forming section 22, a quenching section 24, and cooling section 26. The individual components are generally aligned in a closely spaced, end-to-end relationship. U.S. Pat. Nos. 4,139,359 to Johnson et al, and 4,556,406 to Kahle, are representative of the current roll forming technology and their teachings are incorporated by reference herein. The furnace 20 typically heats the glass sheet to a temperature in the range of 1150° F. to 1220° F. (620° C. to 660° C.). Conveying rolls 28 are longitudinally spaced and transversely positioned within the furnace 20 to support and convey the glass sheet therethrough. At the end of the furnace 20 the glass sheet is moved over transfer rolls 30 into forming section 22 having forming rolls 32 which are the subject of this invention.

The roll forming section 22 includes a plurality of forming rolls 32. Successive forming rolls may be arranged in spaced relation, downstream from one another and mounted on a frame 34 as illustrated in FIG. 1. As the heat softened glass sheet is conveyed over the forming roll 32 it deforms by gravity and assumes a transverse radius of curvature corresponding to that of the forming rolls 32. Block and shim assemblies 36 may be used to mount the forming rolls 32 on the frame 34 along a smooth arcuate path of a radius related to the longitudinal curvature of the longitudinal edges of the glass sheet to be shaped. The practice of determining the elevation of successive block and shim assemblies 36, so as to position the assemblies along a longitudinal radius, is known in the art and will not be discussed further.

With continued reference to FIG. 1, the forming section 22 may have an additional set of upper forming rolls 38 similar in design to the forming rolls 32 as will be discussed later. These forming rolls 38 are supported from frame 40. The upper forming rolls 38 are generally mounted directly over a corresponding lower forming roll 32 and are adjusted so that lower surface of each upper forming roll 38 is uniformly spaced above the upper surface of a corresponding lower forming roll 32. As a result the transverse curvature of the upper forming roll 38, is slightly sharper than the transverse curvature of the corresponding lower forming roll 32. This spaced relation is slightly more than the thickness of a glass sheet passing therebetween.

After passing through the forming section 22, the glass sheet is conveyed through the quench section 24 on quenching rolls 42 as illustrated in FIG. 1. The rolls 42 have the same transverse curvature as the forming rolls 32 and support the shaped glass sheet during quenching. The rolls 42 may be similar in design to forming rolls 32 to be discussed later or may be fixed radius conveyor rolls as disclosed in U.S. Pat. No. 4,311,509 to Reader et al, which teachings are incorporated by reference herein. The rolls 42 are mounted on quenching frame 44 along a continuation of the curved path formed by the forming rolls 32. This arcuate path continues uninterrupted through the quench section 24 until such time that the glass sheet is cooled and sufficiently rigid to retain its curved configuration when conveyed along a horizonal path.

The quench section 24 includes nozzles 46 spaced above and below the glass sheet. The nozzles 46 extend from an air plenum 48 having a lateral radius of curvature that may approximate the transverse curvature of the glass sheet. Successive nozzles 46 and plenum 48 assemblies are positioned along a longitudinal path approximating the curved path of the glass sheet through quench section 24.

The glass sheet exits the quench section 24 and is conveyed into the cooling section 26 where cooling continues until the shaped glass sheet can be handled for additional operations.

Figure 3:
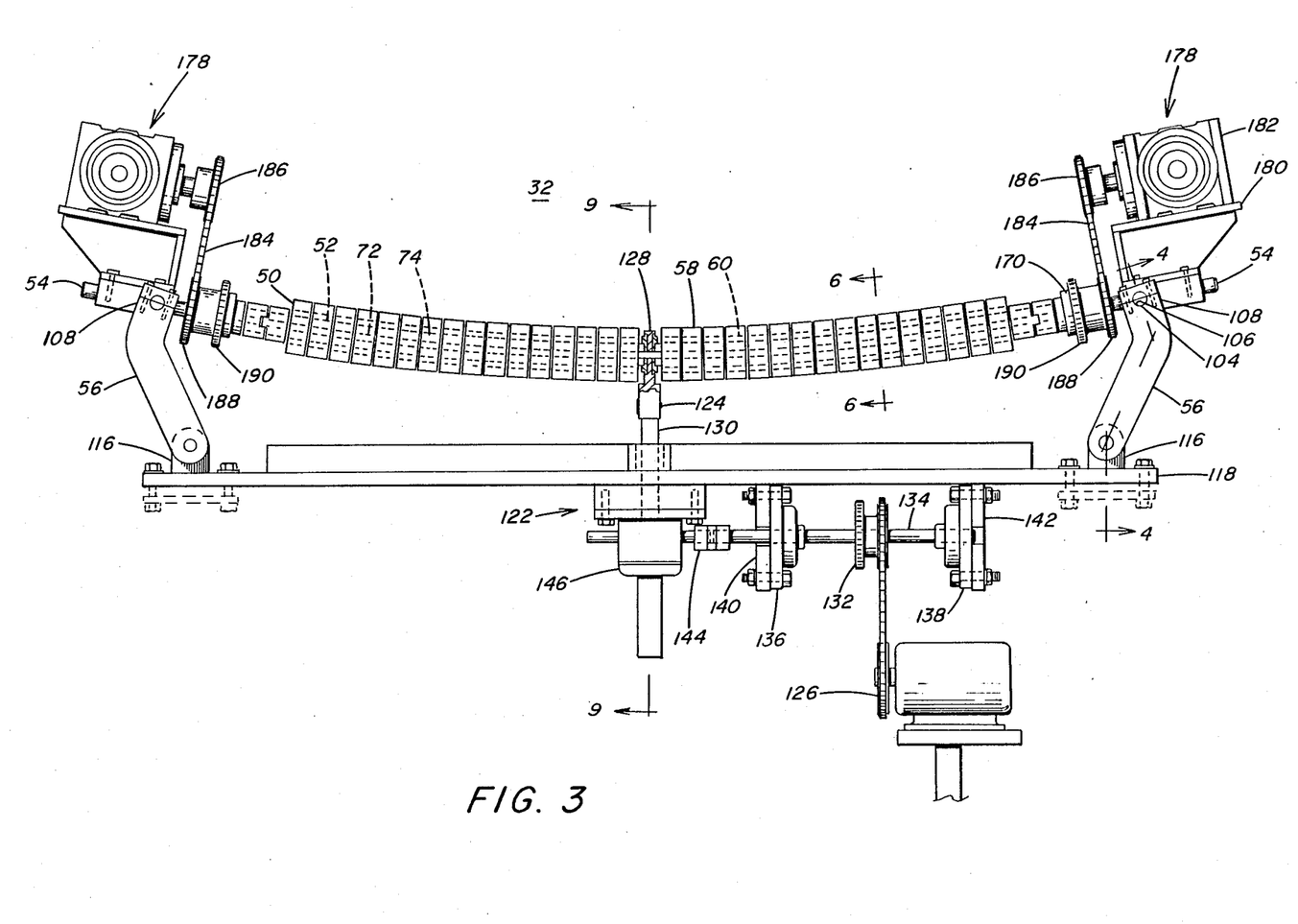
FIG. 3 is an elevational view of the preferred embodiment of the conveyor roll of the present invention.
Figure 4:
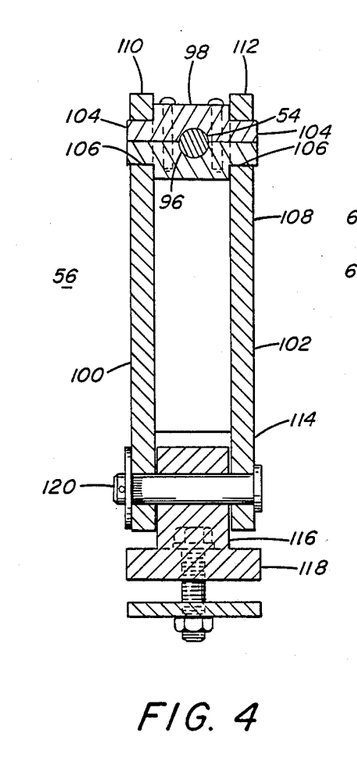
FIG. 4 is a section through line 4—4 of FIG. 3 of the conveyor roll showing the end support.
Figure 5:
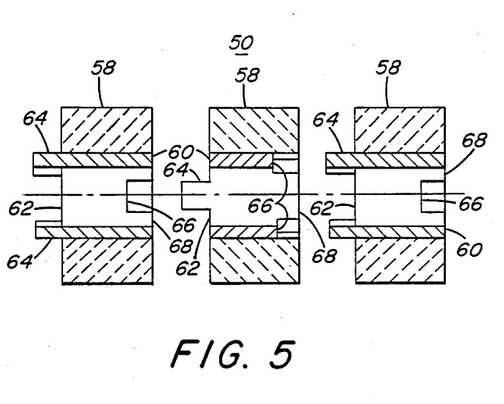
FIG. 5 is an exploded view of a portion of the conveyor roll showing the interlocking hub members of the support members with portions removed for clarity.
Figure 6:
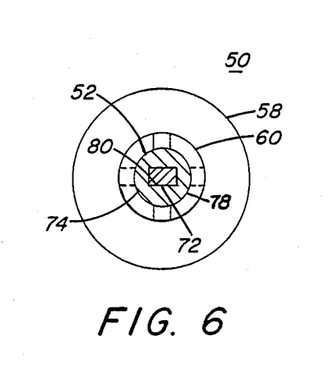
FIG. 6 is a view through line 6—6 of FIG. 3 showing the collar and hub of the glass sheets support members of the conveyor roll.

Referring to FIGS. 3 and 4, the adjustable radius forming roll 32 includes a plurality of glass support members 50 rotatably and interconnectably mounted on a shaft assembly 52. End portions 54 of the roll 32 are pivotally mounted at pivoting end supports 56. Although not limiting in the present invention, the glass sheet support members 50 preferably include an outer cylindrically shaped collar 58 made of high heat resistant material and a hub 60, as shown in FIGS. 5 and 6. The collars 58 may be press fit or glued onto the hubs 60. The members 50 are interconnected as disclosed in U.S. Pat. No. 4,311,509 to Reader et al. A male face 62 of the hub 60 includes tongue members 64 extending axially outwardly from the face 62. The tongue members 64 are received within axially inwardly extending slots 66 in female face 68 of an adjacent hub 60. The tongue and groove arrangement interconnects the adjacent hubs 60, so that as a first hub member rotates about shaft assembly 52, it also rotates the next adjacent hub which in turn rotates the next adjacent hub, etc, transmitting torque along the length of the interconnected members. Although not limiting in the present invention, in the preferred embodiment, the length of the tongue members 64 is greater than the depth of the mating slots 66 so as to form a loose tongue and groove fit between adjacent glass support members 50 and space adjacent glass support members 50 and allow the roll 32 to be adjusted to varying transverse radii, as will be discussed later. In addition, in the preferred embodiment the position of the tongue members 64 and corresponding slots 66 in adjacent hubs 60 are alternated around the perimeter of the hub 60.

Figures 7, 9:
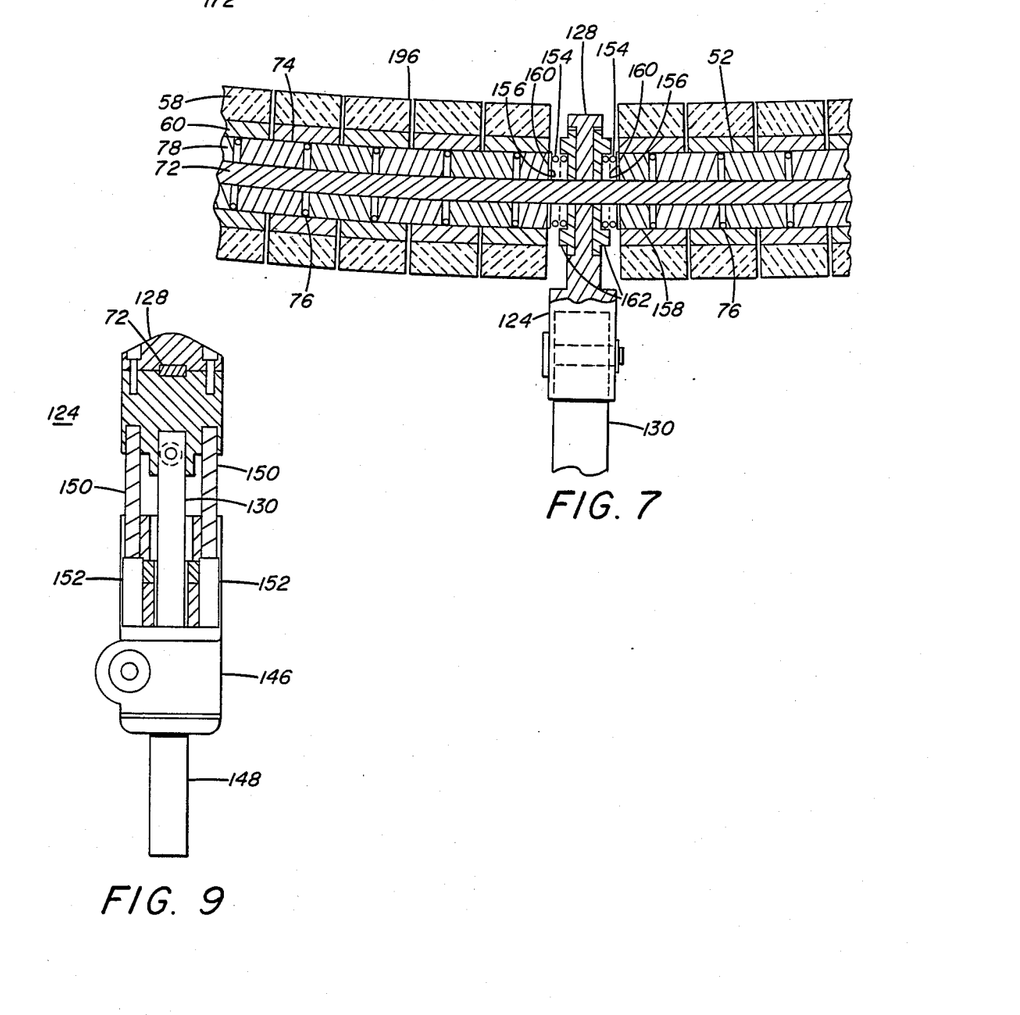
FIG. 7 is an enlarged cross-sectional view of the conveyor hold down arrangement at the center of the conveyor roll.
FIG. 9 is a view through line 9—9 of FIG. 3, showing the conveyor hold down device.

The shaft assembly 52 includes a bar 72 and an outer sleeve 74, as shown in FIGS. 6 and 7. The bar 72 preferably has a rectangular cross-section and is made from spring steel. Although not limited in the present invention, in the preferred embodiment the sleeve 74 includes resilient washers or O-rings 76 alternating with cylindrical spacers 78. Centers 80 of the spacers 78 have a rectangular cross-section complimenting the cross-section of the bar 72. The diameter of the sleeve 74, is such that the glass sheet support member 50 may fit over and freely rotate about the sleeve 74, while maintaining a smooth and essentially continuous glass sheet supporting surface. The sleeves 74 may be of any length that allows the shaft assembly 52 to flex and the glass sheet support members 50 to rotate thereabout. Although not limited in this present invention, the sleeves 74 are preferable ¼ inch to 1 inch (0.635 cm to 2.54 cm) long. In addition, as shown in FIG. 7, the sleeves 74 and O-rings 76 are sized and positioned such that the O-rings 76 are preferably at the center of the hubs 60 along the shaft assembly 52.

Figure 8:
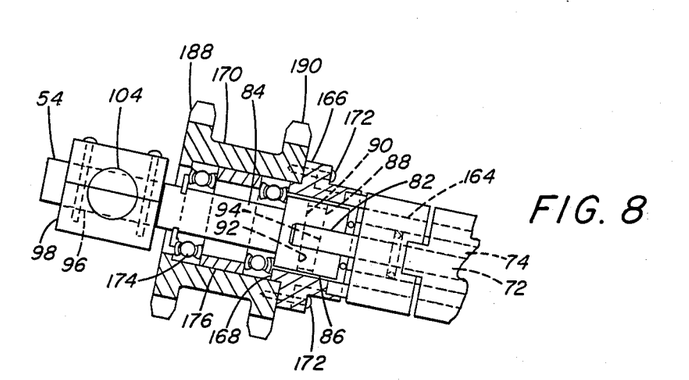
FIG. 8 is an enlarged cross-sectional view of the double sprocket drive arrangement and shaft connection to the conveyor roll frame and the end pivot support.

As shown in FIGS. 3, 4, and 8, each end 82 of the bar 72 is coupled to pivoting end support 56 by connecting shafts 84. Referring specifically to FIGS. 4 and 8, clevis end 86 of the shaft 84 fits over the flat end 82 of the bar 72 and is connected thereto by pin 88 which passes through holes 90 and 92 of the clevis member 86 and hole 94 in end 82 of the bar 72. End 96 of the shaft 84 extends through and is clamped by pivot block 98. The pivot block 98 is positioned between parallel leg portions 100 and 102 of the pivoting end support 56. The pivot block 98 includes extending stub portions 104 that are positioned in a corresponding groove 106 at the upper end 108 of leg portions 100 and 102 of the pivoting end support 56. Blocks 110 and 112 are mounted overtop of the stub portions 104, and connected to the upper ends 108 of the leg Portions 100 and 102, respectively, to rotatably capture the stub portions 104 therebetween. As a result, shaft 84 which passes through and is held in position by pivot blocks 98 is allowed to pivot at the upper end of the pivoting end support 56 about the axis defined by the stub portions 104. The lower ends 114 of the legs 100 and 102 straddle a mounting block 116 that is fixed to roll frame 118. Pivot pin 120 extends through the lower ends 114 of the pivot arm 56, and the mounting block 116 to form a pivoting connection. Roll frame 118 is mounted on block and shim assemblies 36 of the main frame 34 as shown in FIG. 1.

Referring to FIGS. 3, 7, and 9, the forming roll 32 is adjusted by a flexing arrangement 122. Although not limiting in the present invention, the flexing arrangement 122 is preferably located at the center of each roll 32 and includes a hold down device 124 and a flexing drive 126. The hold down 124 captures bar 72 with a collar assembly 128. The lower end of collar 128 is pinned to vertical post 130 that extends to the drive 126. In the preferred embodiment of the invention, the drive 126 includes a sprocket 132 on a shaft 134 rotatably mounted through bearing blocks 136 and 138 to plates 140 and 142 of frame 118. Shaft 134 is connected through coupling 144 to a worm gear screw jack 146. A lower portion 148 of the post 130 of the hold down device 124 includes gear engaging teeth (not shown) that extend into the screw jack 146 to engage a worm gear (not shown) such that rotation of the sprocket 132 and shaft 134 will reciprocate the hold down device 124 via the screw jack 146. Guide rods 150 on the hold down device 124 slide within jackets 152 to maintain proper alignment.

Referring to FIG. 7, compression springs 154, preferably made of stainless steel, are positioned between the collar 128 and surface 156 of sleeve member 158 to bias the glass support members 50 against each other in an axial direction along the shaft assembly 52 while retaining the loosely fitting tongue and groove interconnecting arrangement so as to help transmit the torque between adjacent members 50 along the length of the conveyor roll 32. If desired, a nylon disk 160 and/or a bronze bushing 162 and/or a thrust bearing (not shown) may be placed at the spring/hub interface, or the spring/sleeve interface to help reduce the friction at the opposite ends of each compression spring 154.

Referring to FIG. 3, there is no interconnection between adjacent hub members 60 at the center of the roll 32 because of the location of the collar 128 of the flexing arrangement 122. As a result, in order to drive all the glass support members 50 via hub members 60 on both sides of collar 128, the roll 32 is driven from both ends. Referring to FIG. 8, ends 82 of bar 72 include end hub members 164 that engage a drive hub 166 with a groove arrangement to receive the tongue members of end hub member 122 in a manner as discussed previously. The drive hub 166 includes a collar 168 which extends into a double sprocket assembly 170 and is connected thereto by capscrews 172. The connection between shaft 84 and bar 72 at clevis 86 is within the drive hub 166 with shaft 84 passing through the double sprocket 170 to the pivot block 98. Bearings 174 with spacers 176 are positioned within the sprocket 170 to center its rotation about the shaft 84.

Figure 2:
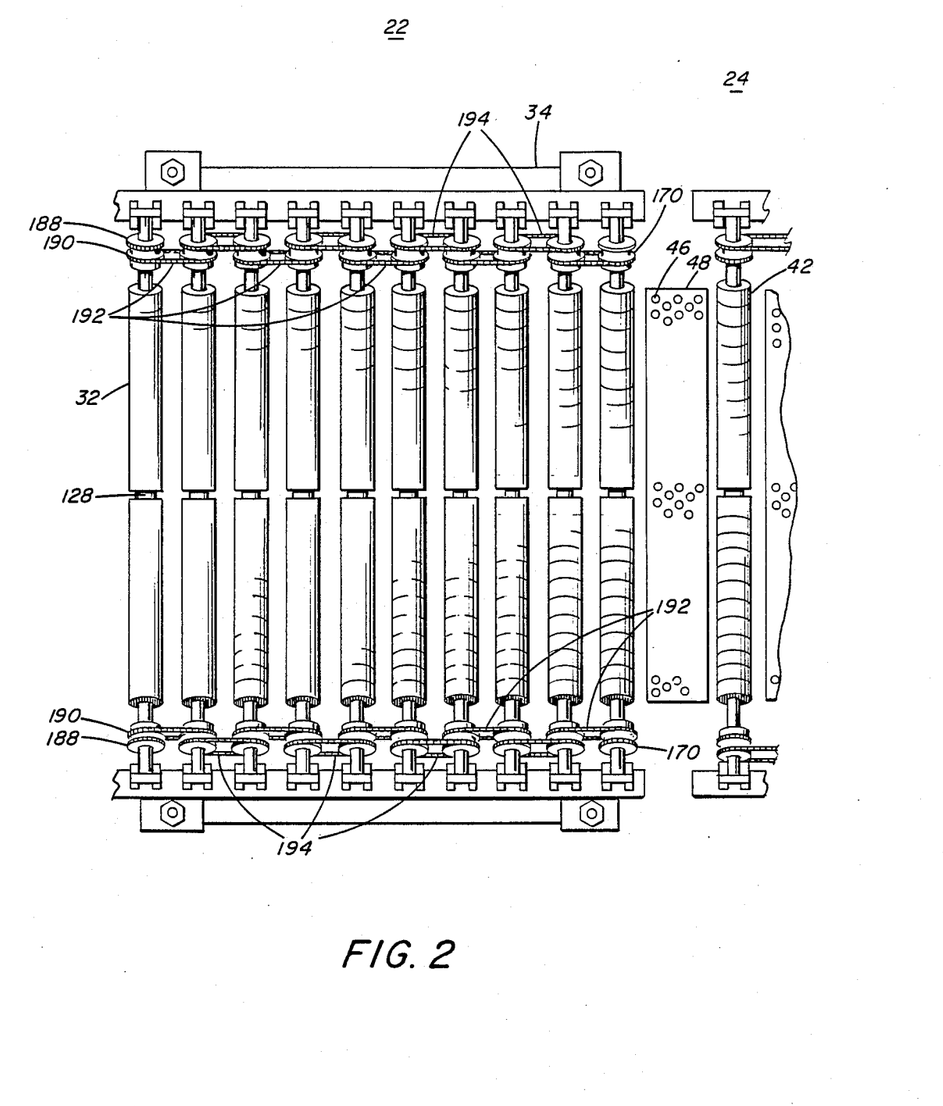
FIG. 2 is a section through line 2—2 of FIG. 1, showing the conveyor rolls of the present invention.

Drive 178 as shown in FIGS. 1 and 3 are mounted on the upper end 108 of a selected pivoting end support 56 and includes a motor platform 180, motor 182, and main chain 184 that connects the sprocket 186 of the motor 182 with the outer sprocket 188 of a double sprocket 170 of a forming roll 32. Each double sprocket 170 also includes an inner sprocket 190, which is connected by a chain drive 192 to the inner sprocket 190 of a double sprocket 170 mounted on an adjacent curved conveyor roll 32, as shown in FIG. 2. Similarly, the outer sprocket 188, of the double sprocket 170 of the adjacent conveyor roll is connected by chain drive 194 to the outer sprocket 188 of the double sprocket 170 of the adjacent conveyor roll 32. This interconnection between inner and outer sprockets of the double sprocket by chain drives continues between adjacent conveyor rolls 32, as shown in FIG. 2, and may be extended as far as needed depending on the number of conveyor rolls in the systems. If required addition drives 178 may be used to drive individual forming roll 32. Upper forming rolls 38 may be connected through drive chains (not shown) to the lower forming rolls 32 so that lower drives 178 also drives the upper forming roll 38. As an alternative, upper forming rolls 38 may use separate drives.

While the invention has been described in connection with a driven adjustable roll wherein the center of the rolls is displaced vertically to adjust the transverse radius of curvature of the roll, one skilled in the art will appreciate that the invention is not necessarily so limited. For example, the adjustable roll may not necessarily be a driven roll but rather have support members 50 that freely rotate about the shaft assembly 52. In addition, the hold down device 124 is not necessarily limited to acting only at the center of the shaft assembly 52 but may be positioned anywhere along the length of the shaft 52 between the end portions 54. Furthermore, multiple hold down devices may be used on a single forming roll 32 to further adjust and modify the transverse curvature of the roll.

In keeping with the teachings of the present invention, it would be obvious to one skilled in the art to use a conveyor roll as previously described for the upper forming rolls 38 shown in FIG. 1. The rolls 38 would be similar in design to that of lower forming rolls 32 except that collars, similar to the collars 58 of glass sheet support members 50, would contact the glass sheet with their lower rather than their upper portions. In addition, a flexing arrangement would be positioned above, rather than below, the roll. It is apparent that to increase the transverse curvature, a post member from the flexing arrangement would move the center of the roll 38 downward and to decrease transverse curvature the post would move the center upward, as is the case with lower forming rolls 32.

In operation, in order to change the transverse curvature conveyor roll 32, sprocket 132 is rotated, which in turn engages the screw jack 146 through shaft 134 and coupling 144. The screw jack 146 raises or lowers posts 130 and collar 128, thus displacing the center of the conveyor roll 32. As the center of the bar is displaced and the shaft assembly 52 is flexed, ends 96 of the connecting shafts 84 rotate angularly about the stub portions 104 at the upper end 108 of the pivoting end supports 56. When the transverse curvature of the roll 32 increases, i.e., the transverse radius of curvatures decreases, the hold down device 124 pulls the center of roll 32 downward to decrease the distance between the pivot blocks at each end of the conveyor roll 32, thus causing the pivoting end support 56 on the left side of FIG. 3 to rotate clockwise about pivot pin 120 on roller frame 118, and the pivoting end support 56 on the right-hand side to rotate counterclockwise. When the transverse curvature of the roll 32 decreases i.e., the transverse radius of curvature increases, the hold down device 124 moves upward to reduce the curvature of the roll 32, and the pivot end supports 56 rotate in a direction opposite of that previously described.

It should be noted that as the forming roll 32 increases in curvature i.e., decreases in transverse radius, the upper edge 196 of adjacent collars 58 move closer together as the glass sheet supporting members 50 become angularly disposed relative to one another. As stated earlier, the tongue and groove interconnecting arrangement spaces adjacent members 50 apart. In this manner, a members 50 may be inclined relative to an adjacent member 50 without edges 196 of the members contacting each other and possibly binding the rotating action of the members 50 about shaft assembly 52.

It should be appreciated that the transverse curvature of each roll 32 can be individually controlled, so that if required, the curvature of the rolls can vary from roll to roll on the same roll forming assembly. It should further be noted that, if required, each of the forming roll flexing arrangement 122 can be interconnected, so that a number of forming rolls 32 may be adjusted simultaneously. A single drive 126 would be interconnected in a manner similar to the double sprocket drive assembly as previously discussed with respect to the conveyor roll 32 or any other type of interconnecting drive as is well known in the art may be used.

The form of the invention shown and described in the specification represents an illustrative preferred embodiment thereof. It is understood that various change may be made without departing from the gist of the invention as defined in the claimed subject matter which follows.

I claim:

1. An adjustable radius conveyor roll for conveying an article comprising:
    a flexible shaft;
    means for pivotally supporting opposing end portions of said shaft;
    a plurality of article contacting members mounted around said shaft in generally adjacent and abutting relationship along said shaft for rotation thereabout; and
    means for displacing a portion of said shaft relative to said end portions of said shaft wherein said portion is intermediate of said end portions of said shaft and said displacing means acts on said intermediate portion.

2. The conveyor roll as in claim 1, wherein said article contacting members include a first set of support members mounted around a first portion of said shaft and a second set of support members mounted around a second portion of said shaft and said displacing means is positioned between said first and second set of support members.

3. The conveyor roll as in claim 2, wherein said displacing means includes a collar to engage said shaft between said first and second set of support members and means to move said collar in a generally vertical direction so to vary the curvature of said shaft and said conveyor roll.

4. The conveyor roll as in claim 3, wherein said collar moving means includes a post member secured at one end to said collar and secured at its opposite end to a roll flexing drive.

5. The conveyor roll as in claim 4, wherein said portion of said shaft acted upon by said displacing means is the center of said shaft.

6. The conveyor roll as in claim 4, wherein said flexible shaft includes a non-circular bar and a plurality of cylindrically shaped sleeve members coaxially mounted along the length of said bar and resilient spacers positioned between adjacent sleeve members.

7. The conveyor roll as in claim 6, wherein said bar has a rectangular cross section and is made from spring steel.

8. The conveyor roll as in claim 6, wherein each of said article supporting members include a cylindrically shaped hub member mounted around said sleeve members of said flexible shaft and a cylindrically shaped collar in tightly fitting relation about said hub.

9. The conveyor roll as in claim 8, further including means to apply torque to one of said hubs at each end portion of said shaft and means to interconnect said adjacent hubs in each of said first and second sets of support members to transmit said torque between adjacent hubs.

10. The conveyor roll as in claim 9 wherein each of said hubs includes a tongue and groove to form loose interfitting tongue and groove couplings capable of transmitting said torque between said adjacent hubs while permitting a limited freedom of axial movement between said adjacent hubs along the length of said shaft, wherein a tongue extending axially outward from one of said hubs towards one end of said shaft fits into a groove of an adjacent hub at one orientation and a tongue extending axially outward from said adjacent hub towards said one end of said shaft fits into a groove of a next hub adjacent to said adjacent hub at a different orientation from said one orientation.

11. The conveyor roll as in claim 2, wherein each end portion of said shaft includes a drive hub mounted around said shaft interconnected at a first axial end to one of said hub members and on a second axial end to a roll sprocket member mounted around said shaft and said means to apply torque includes a motor with a main sprocket and a drive chain interconnecting said drive sprocket with said roll sprocket.

12. The conveyor roll as in claim 11, further including compression springs mounted around said shaft and between said collar and said first set of support members and between said collar and said second set of support members to bias said hubs in an axial direction sufficient to retain a loosely fitting relationship between said tongues and grooves and to enable said hubs to transmit a torque applied to said drive hub to said other adjacent hubs, whereby said collars rotate in unison at a uniform preferable speed.

13. The conveyor roll as in claim 12, wherein said pivotally supporting means includes a support arm pivotally mounted at a lower end to a roll frame and a pivot block pivotally mounted at an upper portion of said support arm, wherein said end portions of said flexible shaft pass through and are retained by said pivot block.

14. A conveyor for conveying articles comprising a plurality of conveyor rolls as in claim 13 extending transversely of a path of movement of said article and longitudinally spaced from one another along said path, further including means to apply a torque to both ends of each of said plurality of conveyor rolls to rotate said rolls in unison.

15. The conveyor as in claim 14, further including means to displace said intermediate portion of said shaft on each of said conveyor rolls in unison.

16. The conveyor as in claim 15, wherein said article is a glass sheet.

17. A method of adjusting the transverse radius of curvature of an adjustable radius conveyor roll comprising:
rotatably mounting a plurality of article contacting members along a flexible shaft;
pivotally supporting end portions of said shaft; and
applying a force to a portion of said shaft intermediate of said end portions to deflect said shaft so as to pivot said shaft about said end portions and vertically displace said intermediate portion of said roll relative to said end portions wherein said deflection changes the transverse radius of curvature of said roll.

18. The method as in claim 17, wherein said applying step includes applying said force to the midpoint of said roll such that said article contacting members mounted around a shaft of said roll form a continuous, arcuate supporting surface.

19. The method as in claim 17 further including the step of interconnecting adjacent ones of said article contacting members, and applying a torque to one of said contacting members wherein said torque to transmitted between adjacent contacting members.

* * * * *